July 19, 1949.   H. GEISSLER ET AL   2,476,543
FAN
Filed Jan. 2, 1948

INVENTORS
Henry Geissler and
BY John Cassie

Robert J. Palmer
ATTORNEY

Patented July 19, 1949

2,476,543

UNITED STATES PATENT OFFICE 2,476,543

FAN

Henry Geissler, Sharon, and John Cassie, Dedham, Mass., assignors to Westinghouse Electric Corporation, East Pittsburgh, Pa., a corporation of Pennsylvania Application January 2, 1948, Serial No. 60

4 Claims. (Cl. 230—114)

This invention relates to fans having axial inlets, and relates more particularly to duct connections to the axial inlets for supplying secondary air thereinto.

For maximum performance, the axial inlet of a fan must be nicely streamlined with no obstructions to gas flow extending thereinto. However, for some duties, it is necessary to supply secondary air into a fan inlet through a supply duct; and, in the past, such supply ducts, when not used for supplying secondary air, have extended into the fan inlets and have obstructed the flow thereinto. An example of such a duty is the supply of air through an air heater for the combustion chamber of a steam-power plant. The air supplied by the fan is drawn from the apparatus room in which the fan is located, and blown through the interiors of heat-exchange tubes, over the exteriors of which, the flue gases of the plant pass. At low plant loads, the temperature of the inlet header sheet of the air heater falls below the dew point temperature of the corrosive vapors of the flue gases resulting in the condensation of such vapors on the header sheet with resulting corrosion. Accordingly, it has been the practice at low plant loads to recirculate heated air from the outlet of the air heater into the inlet of the fan for maintaining a large volume of heated air through the heater. Recirculation ducts have extended into the inlets of the fans and have interfered with the flow of air thereinto when no recirculation was required.

An object of this invention is to provide a duct connection to the axial inlet of a fan which does not interfere with the flow of primary air thereinto when there is no flow of secondary air through the duct connection.

Figure 1:
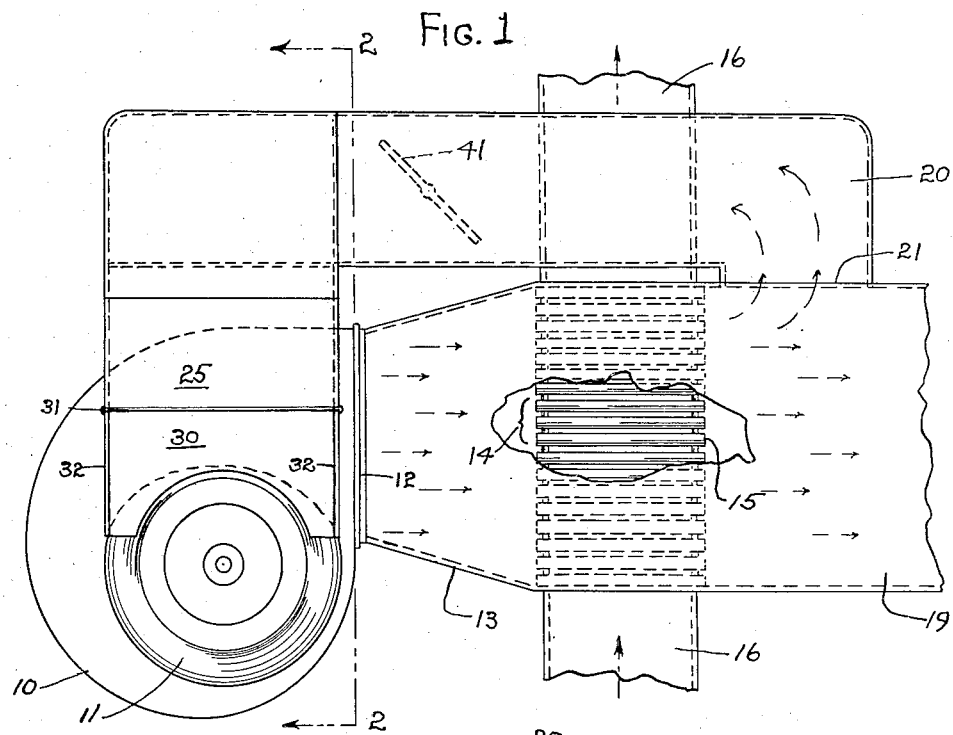
Figure 2:
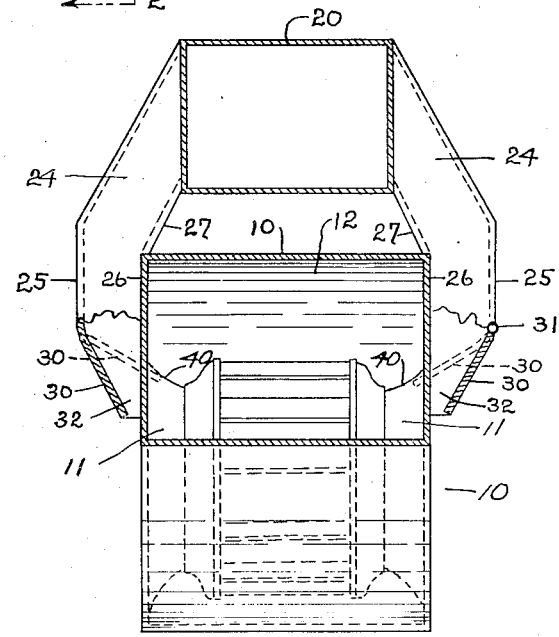

Fig. 1 is a side elevation of a centrifugal fan connected to an air heater for a steam-power plant, and embodying this invention, a portion of a side wall of the air heater being removed, and Fig. 2 is a sectional view along the lines 2—2 of Fig. 1, with the lower portions of the side walls of the recirculation ducts at the fan inlets, being removed.

The centrifugal fan 10 having the opposed axial inlets 11 through which air is drawn from the apparatus room in which the fan is located, has its outlet 12 connected through the transformation duct 13 to the air inlet of the air heater 14.

The air heater 14 consists of a nest of tubes 15 through which the air from the fan passes, and has the duct 16 through which the flue gases from the power plant are supplied to flow over the exteriors of the tubes for heating the air passing therethrough. The heated air from the tubes passes through the supply duct 19 through the combustion chamber of the plant.

The recirculation duct 20 has its inlet connected at 21 to the duct 19 at the downstream side of the heater 14, and has the two branch ducts 24 connected thereto above the fan. The ducts 24 extend down to, and contact, the fan casing, the outer side walls 25 of the ducts 24 extending alongside the side walls 26 of the fan casing. The lower ends of the upper portions of the inner side walls 27 of the ducts 24 (the walls opposite the duct walls 25) contact the upper portions of the side walls 26 of the fan casing in alignment therewith, and the casing side walls 26 below the walls 27, form the inner side walls of the ducts 24 opposite the outer side walls 25 of same.

The lower portions 30 of the outer side walls of the ducts 24 are pivoted at 31 to the lower ends of the outer side walls 25 and are arranged to swing inwardly between the end walls 32 of the ducts 24, from the position shown by the continuous lines of Figs. 1 and 2 to the position shown by the dashed lines of Figs. 1 and 2. The position of the duct wall portions 30, shown by the continuous lines of Figs. 1 and 2, is the position these duct wall portions take when the lower portions of the ducts 24 are fully open for the supply of recirculated air into the fan inlets. At such time, as illustrated by Fig. 2, the wall portions 30 are spaced from the fan inlets for permitting the unrestricted flow of recirculated air through the ducts into the fan inlets. As illustrated by Fig. 1, the lower ends of the duct wall portions 30 have interior portions formed in circular arcs co-axial with the fan inlets, thus providing equal distribution of air in the upper portions of the fan inlets which are overlapped by the duct wall portions 30.

The position of the duct wall portions 30, shown by the dashed lines of Figs. 1 and 2, is the position they would take when no recirculation is required and the outlets of the ducts 24 are therefore closed off. In this position, the duct portions 30 substantially line up with the converging inlet walls 40 of the fan so that the air from the apparatus room will flow smoothly over the surface of same into the fan inlets without providing any appreciable disturbance in air flow.

The damper 41 may be provided in the duct 20 for varying the volume of recirculated air when this is desired.

In operation at reduced plant loads when reduced air volumes would be required for combustion, an operator would adjust the duct portions 30 to the positions shown by the continuous lines of Figs. 1 and 2, whereby the recirculated air would pass freely into the fan inlets, together with the primary air from the apparatus room. When the plant load increases to the point where no recirculation is required, the duct lower portions 30 are moved inwardly against the inlet walls 40 so that they do not obstruct the flow of primary air into the fan inlets.

While one embodiment of the invention has been described for the purpose of illustration, it should be understood that the invention is not limited to the exact apparatus and arrangement illustrated as modifications thereof may be suggested by those skilled in the art, without departure, from the essence of the invention.

What is claimed is:

1. In combination with a fan having an axial inlet through which primary air is drawn, said inlet having an air guiding wall therearound, a duct for supplying secondary air into the inlet, said duct having a pivoted wall which is adjustable from one position in which it is spaced from said inlet and overlaps same, and which is adjustable to another position in which it contacts said air guiding wall and extends substantially in alignment with same.

2. The combination of claim 1 in which the pivoted wall has in its end opposite its point of pivot, a circular arc which is co-axial with the inlet when the pivoted wall is adjusted to said one position.

3. The combination with a fan having an axial inlet through which primary air is drawn, said inlet having an air guiding wall therearound, said fan having a casing wall extending substantially perpendicular to the axis of the inlet, a duct for supplying secondary air into the inlet, said duct having a side wall extending substantially parallel to said casing wall, said casing wall forming the wall of said duct opposite said side wall, said side wall having a pivoted end portion which is adjustable to one position in which it contacts said air guiding wall and extends substantially in alignment with same, and which is adjustable to another position in which it is spaced from said inlet and overlaps same.

4. The combination as claimed in claim 3 in which the pivoted end portion of the duct has in its end opposite its point of pivot, a circular arc which is co-axial with said inlet when the pivoted end portion of the duct is adjusted to the position in which it is spaced from the inlet.

HENRY GEISSLER.
JOHN CASSIE.

No references cited.